May 24, 1966  S. H. CREED  3,252,591
FRUIT FEEDING MECHANISM
Original Filed May 31, 1962  15 Sheets-Sheet 1

FIG_1

INVENTOR
SHERMAN H. CREED
BY Hans G. Hofmeister.
ATTORNEY

May 24, 1966  S. H. CREED  3,252,591
FRUIT FEEDING MECHANISM
Original Filed May 31, 1962  15 Sheets-Sheet 2

FIG_2

INVENTOR
SHERMAN H. CREED

BY Hans G. Hoffmeister.
ATTORNEY

May 24, 1966 S. H. CREED 3,252,591
FRUIT FEEDING MECHANISM
Original Filed May 31, 1962 15 Sheets-Sheet 3

INVENTOR
SHERMAN H. CREED
BY Hans G. Hoffmeister.
ATTORNEY

May 24, 1966
S. H. CREED
3,252,591
FRUIT FEEDING MECHANISM
Original Filed May 31, 1962
15 Sheets-Sheet 4
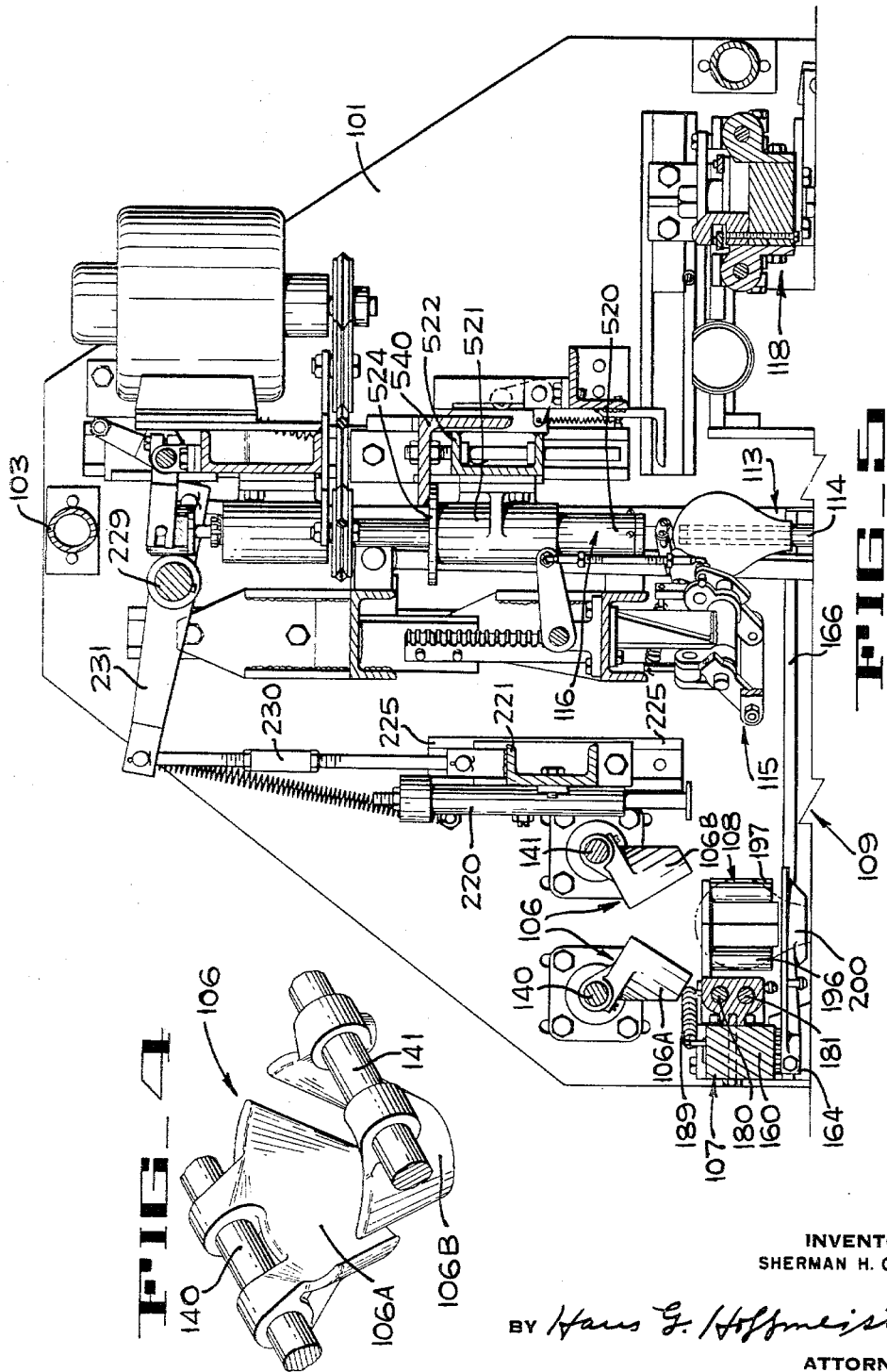
INVENTOR
SHERMAN H. CREED
BY Hans G. Hoffmeister.
ATTORNEY

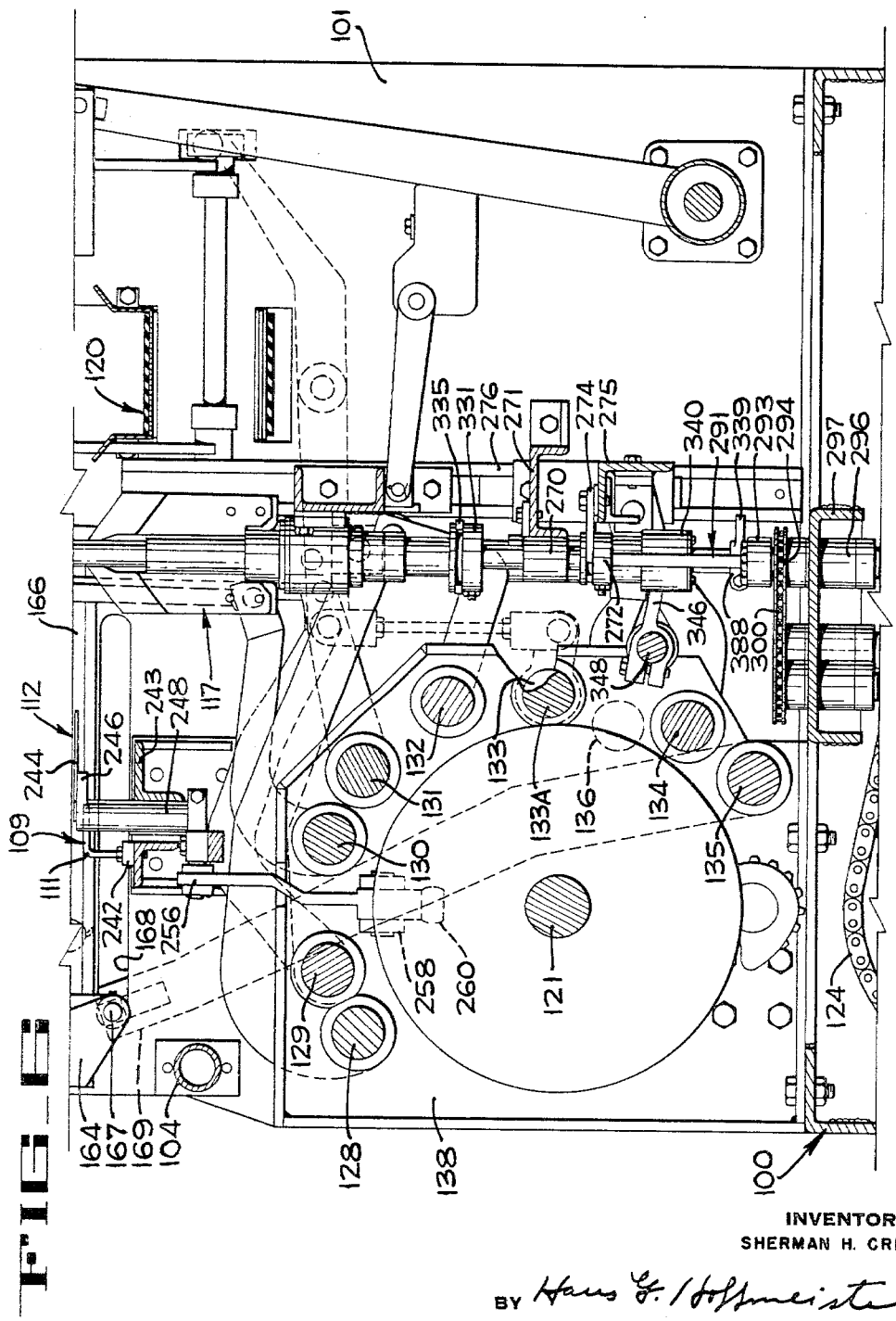

May 24, 1966  S. H. CREED  3,252,591
FRUIT FEEDING MECHANISM
Original Filed May 31, 1962  15 Sheets-Sheet 6
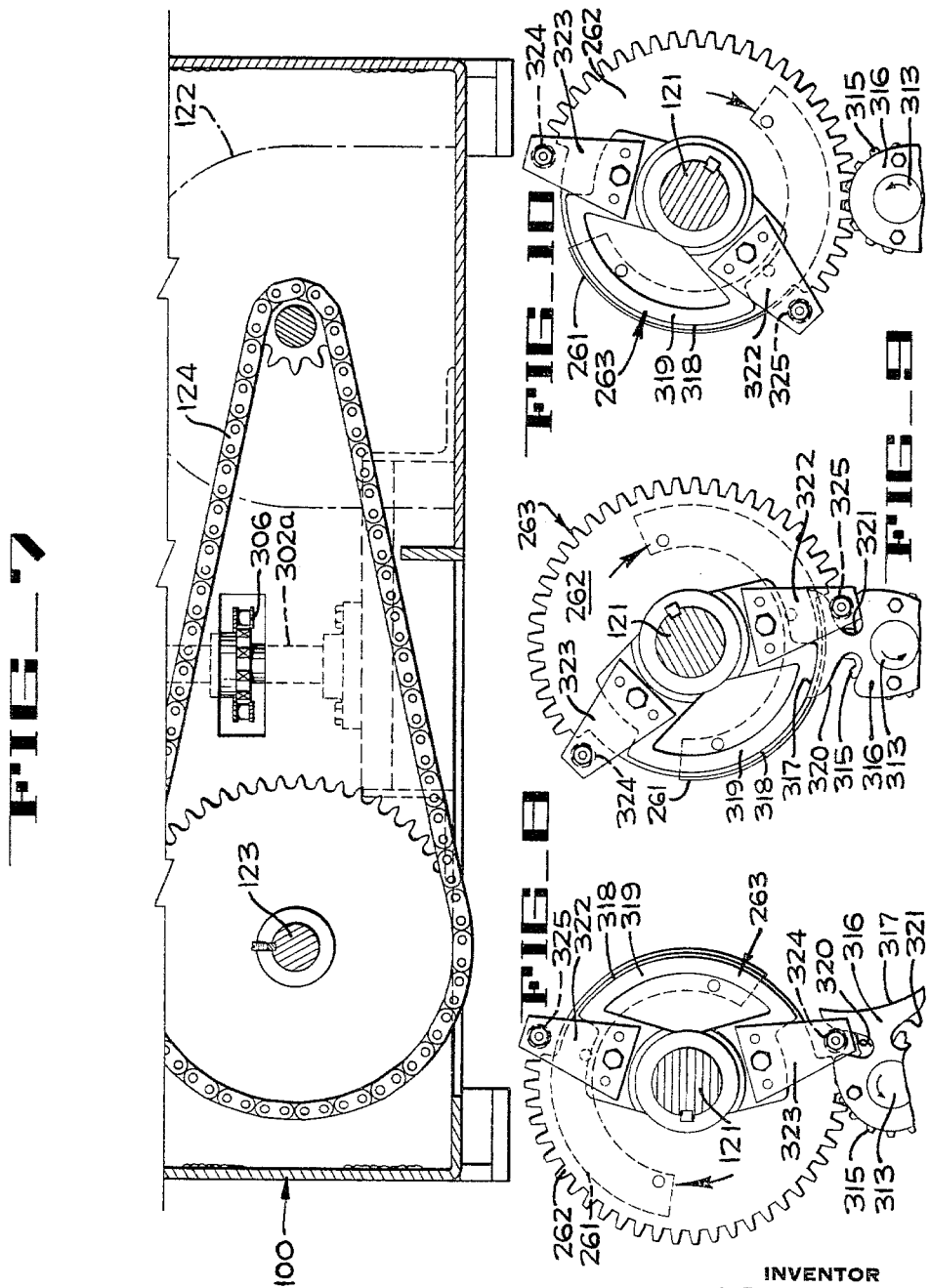
INVENTOR
SHERMAN H. CREED
BY Hans G. Hoffmeister
ATTORNEY

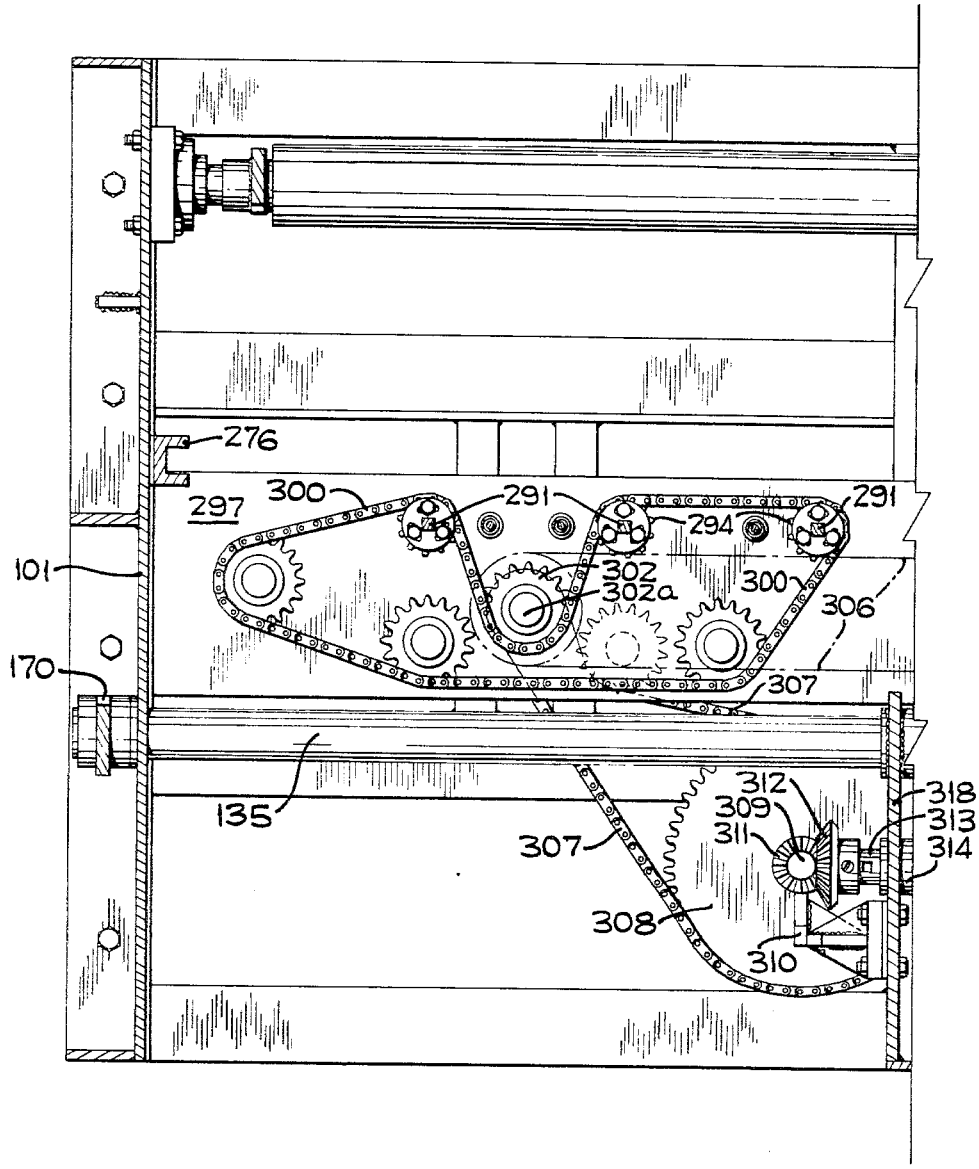

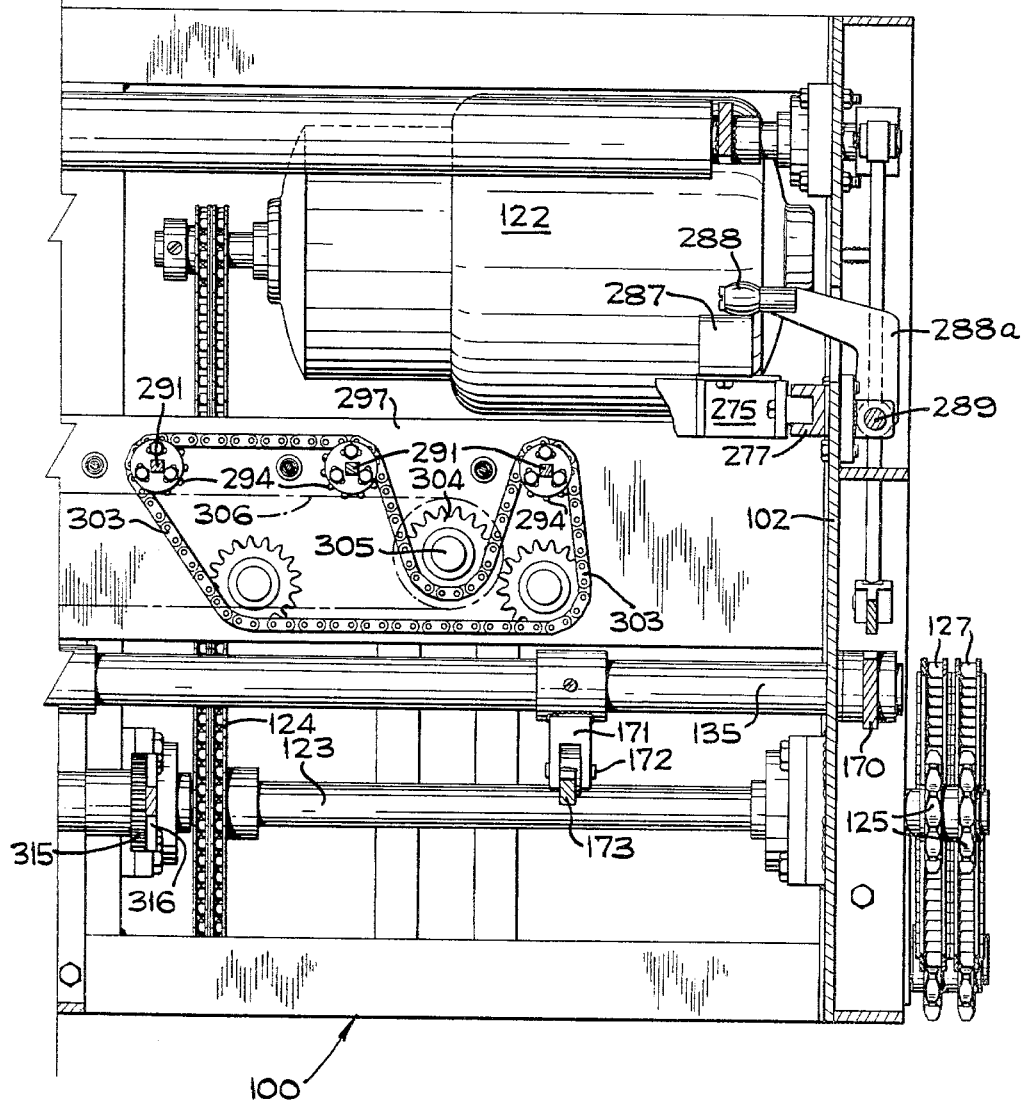

May 24, 1966      S. H. CREED      3,252,591
FRUIT FEEDING MECHANISM
Original Filed May 31, 1962      15 Sheets-Sheet 9
FIG_13
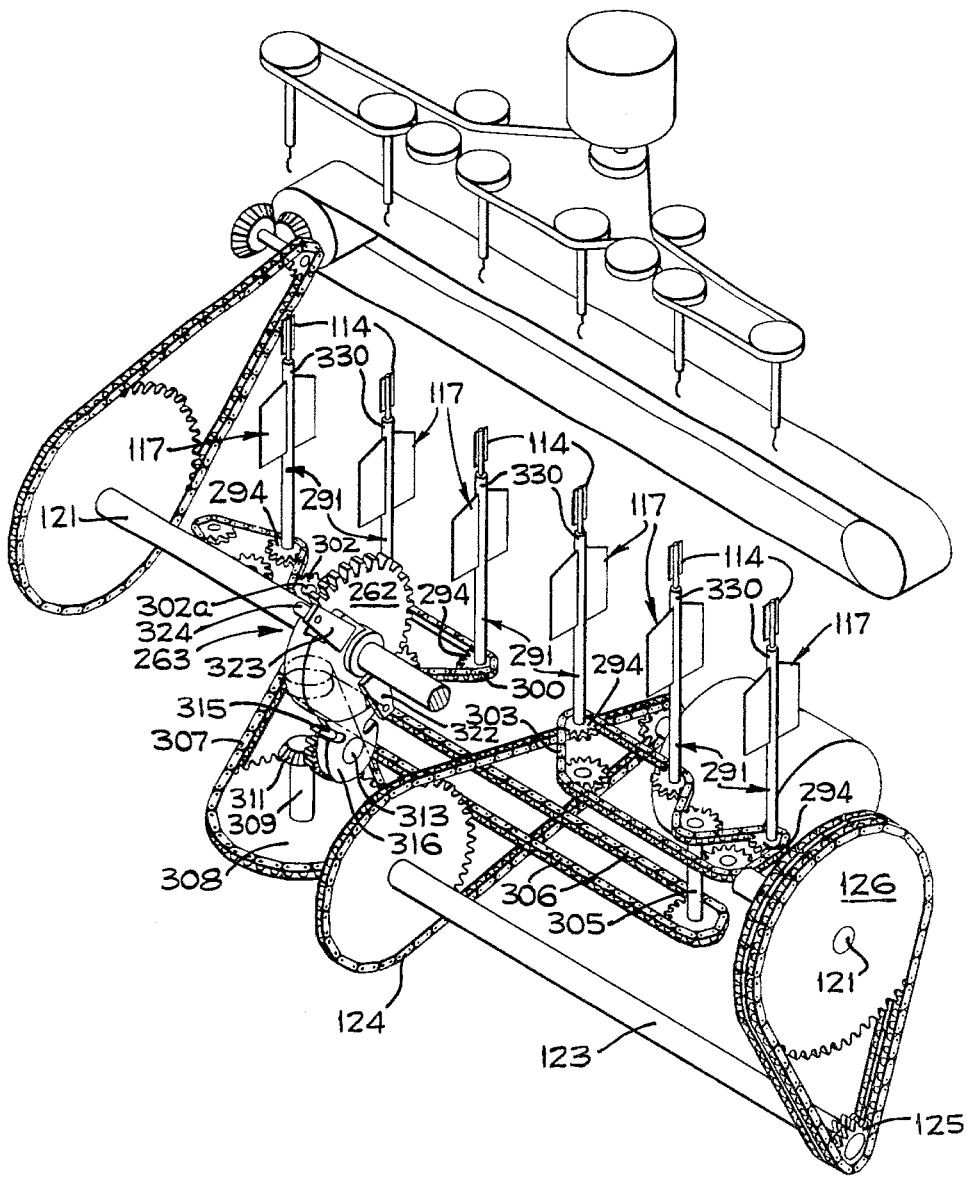
INVENTOR
SHERMAN H. CREED
BY Hans G. Hoffmeister
ATTORNEY

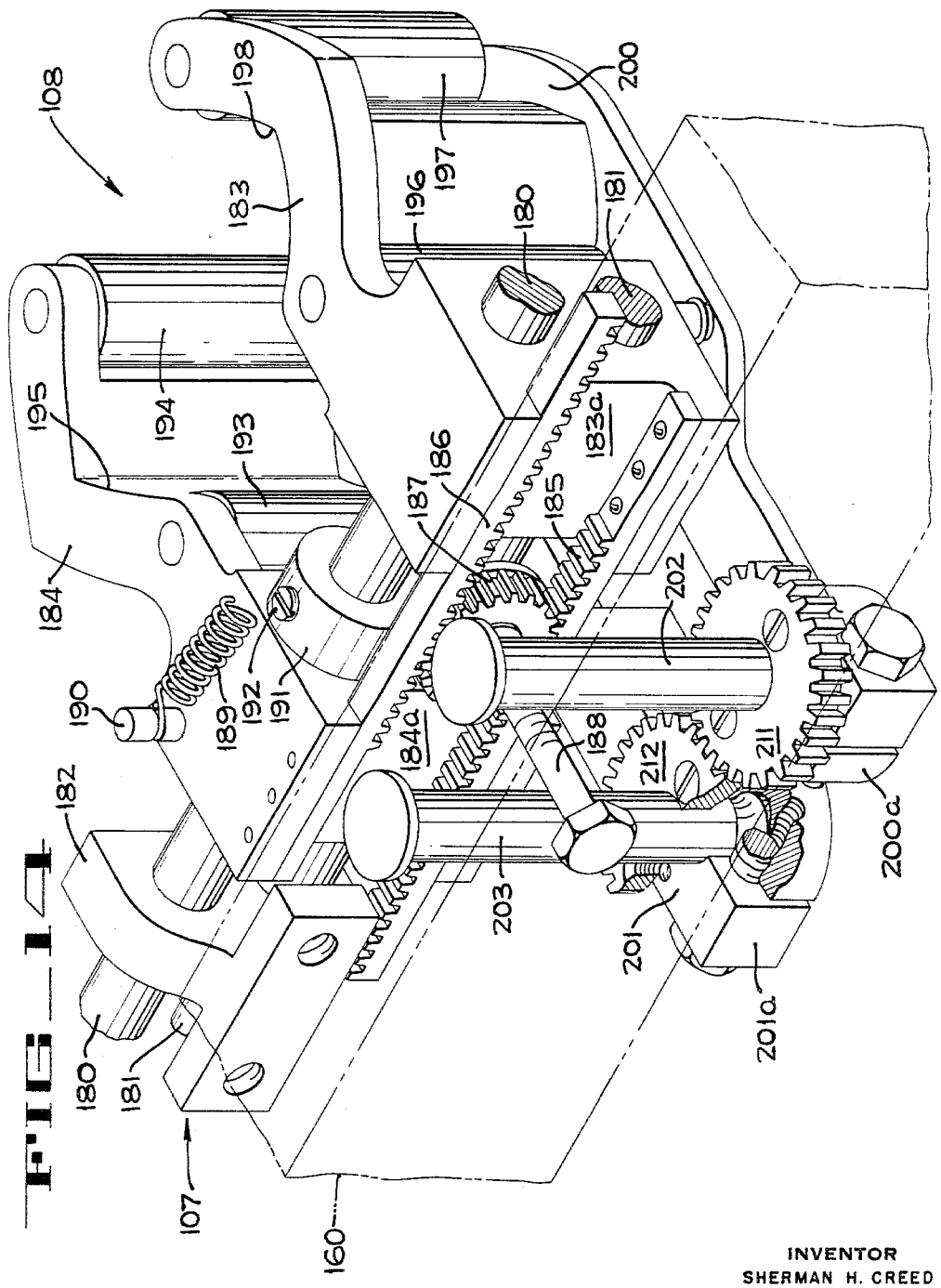

May 24, 1966  S. H. CREED  3,252,591
FRUIT FEEDING MECHANISM
Original Filed May 31, 1962  15 Sheets-Sheet 11
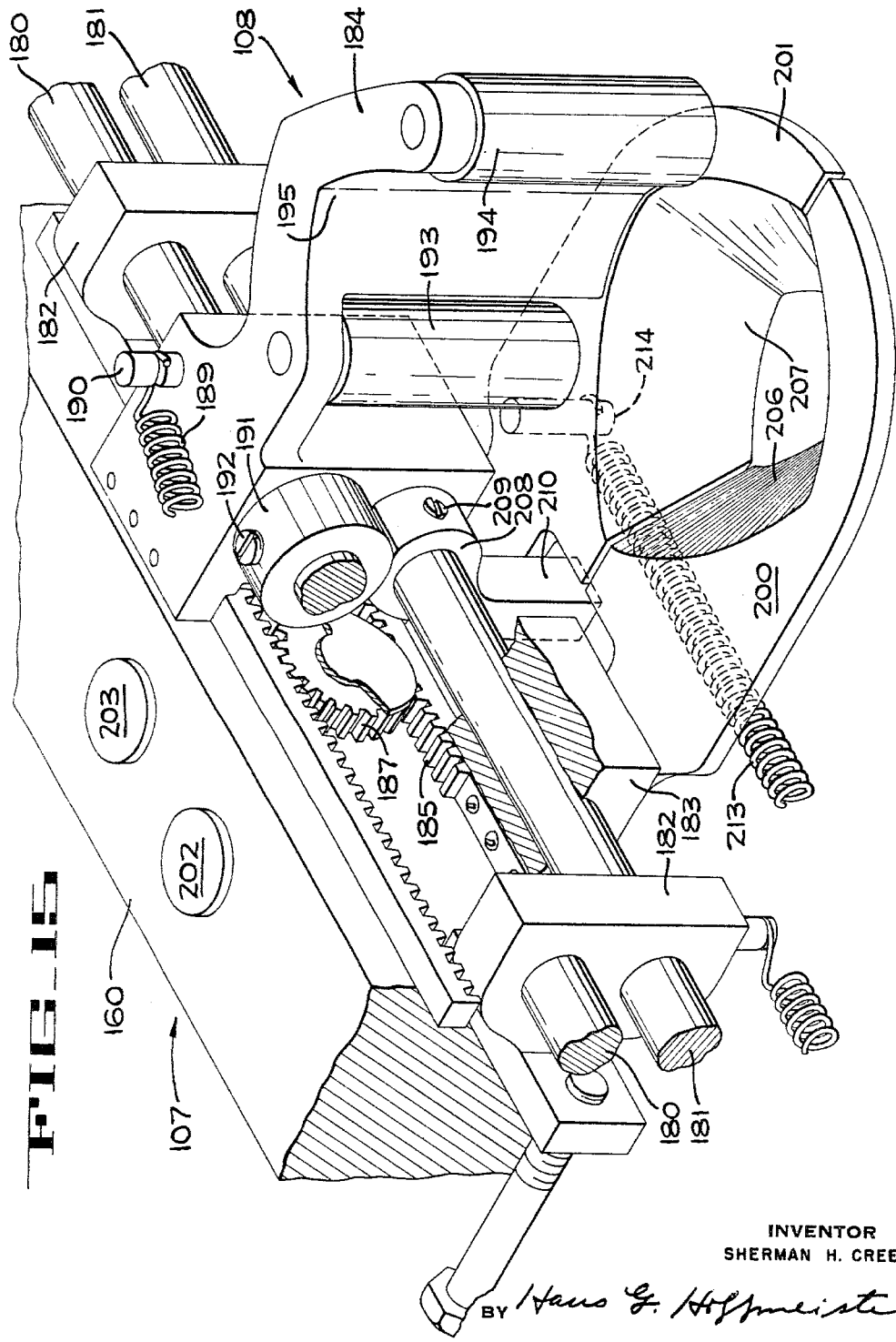
INVENTOR
SHERMAN H. CREED
BY Hans G. Hoffmeister
ATTORNEY

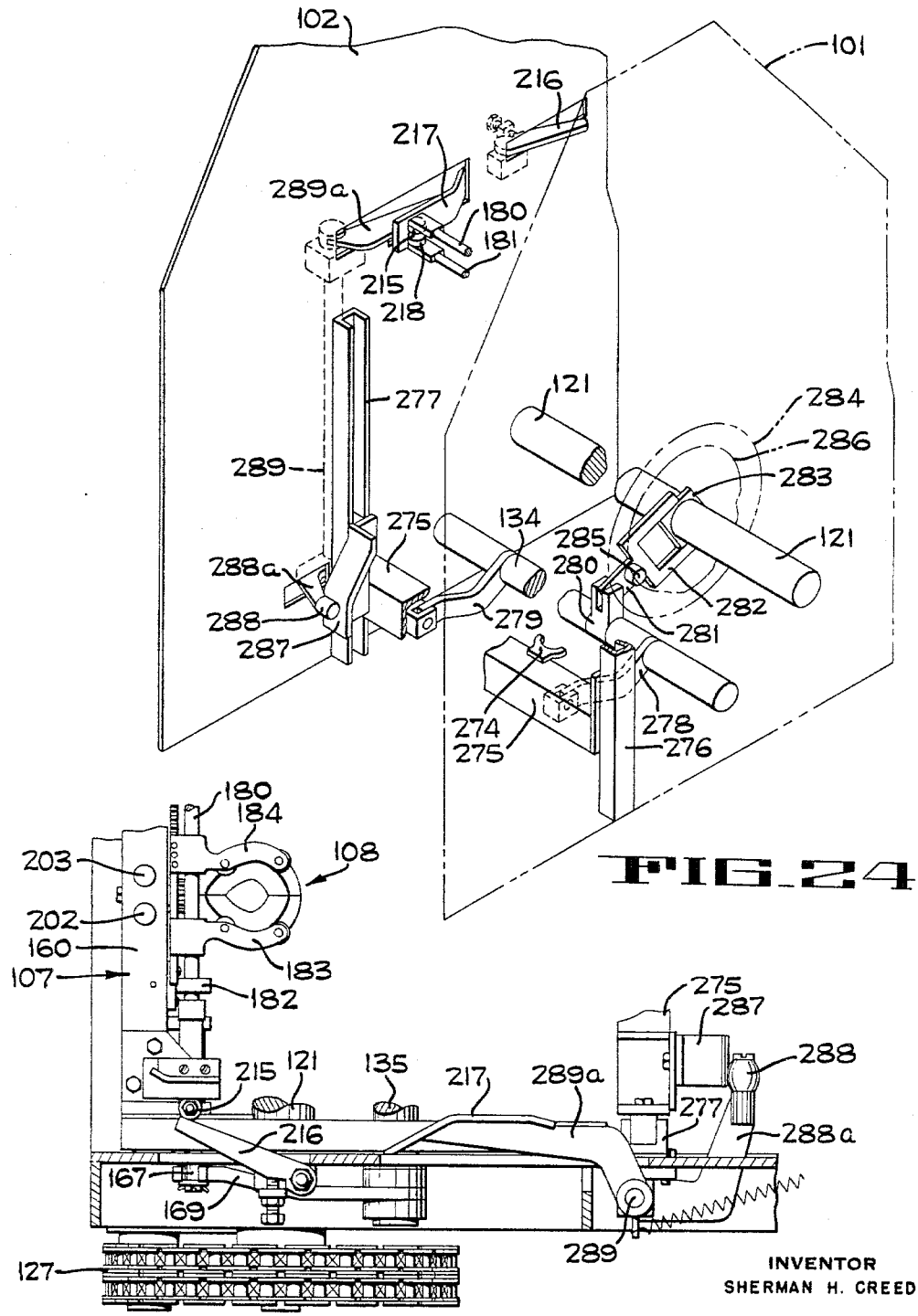

May 24, 1966  S. H. CREED  3,252,591
FRUIT FEEDING MECHANISM
Original Filed May 31, 1962  15 Sheets-Sheet 13
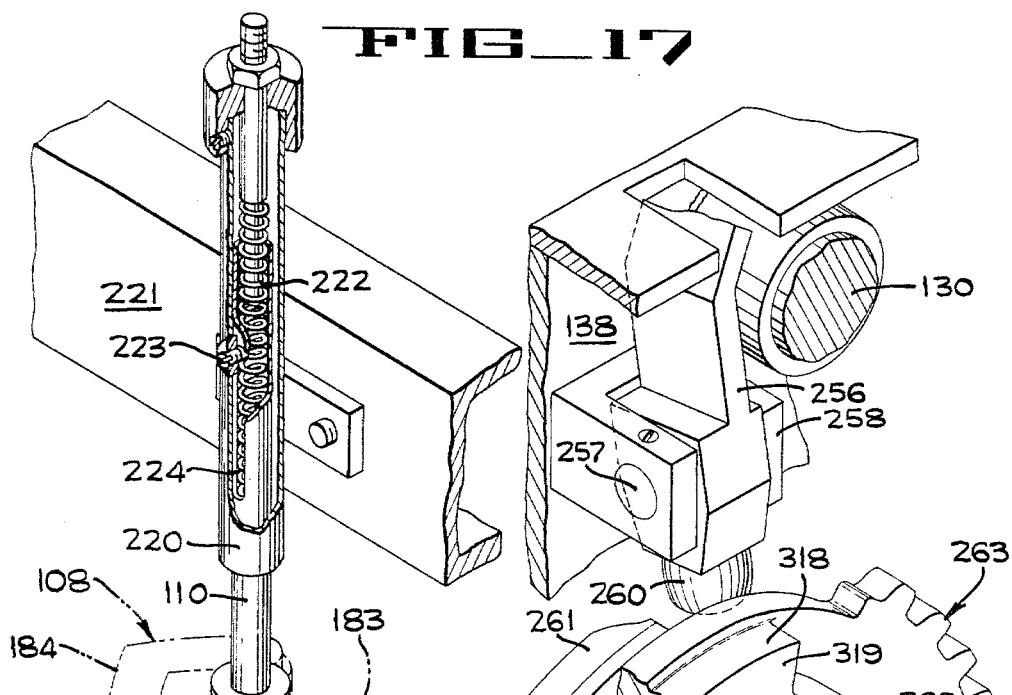
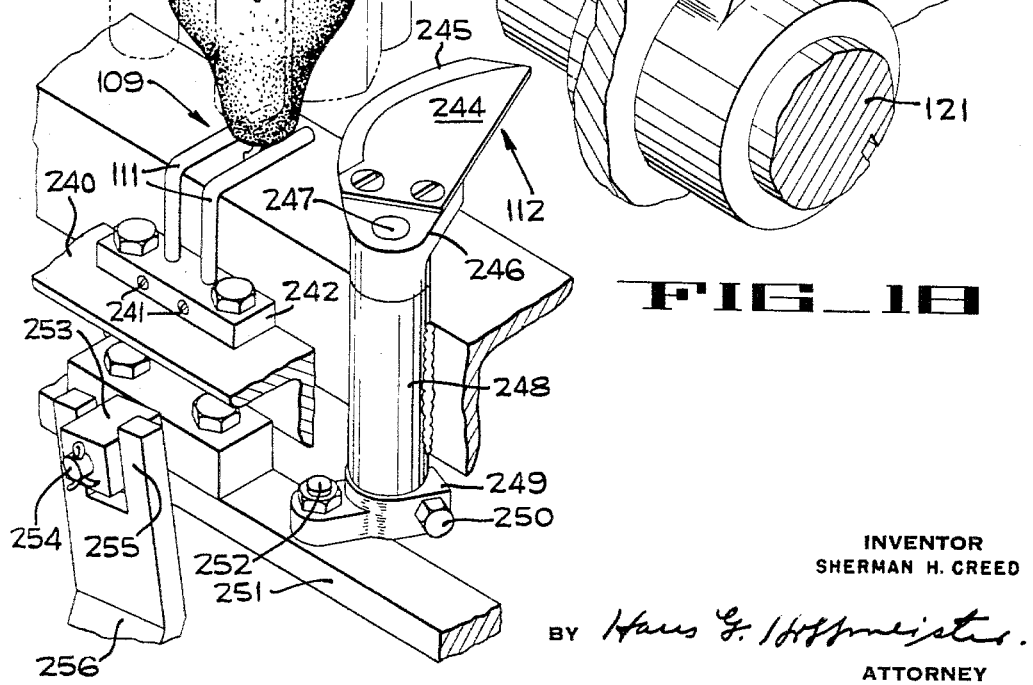
INVENTOR
SHERMAN H. CREED
BY Hans G. Hoffmeister
ATTORNEY

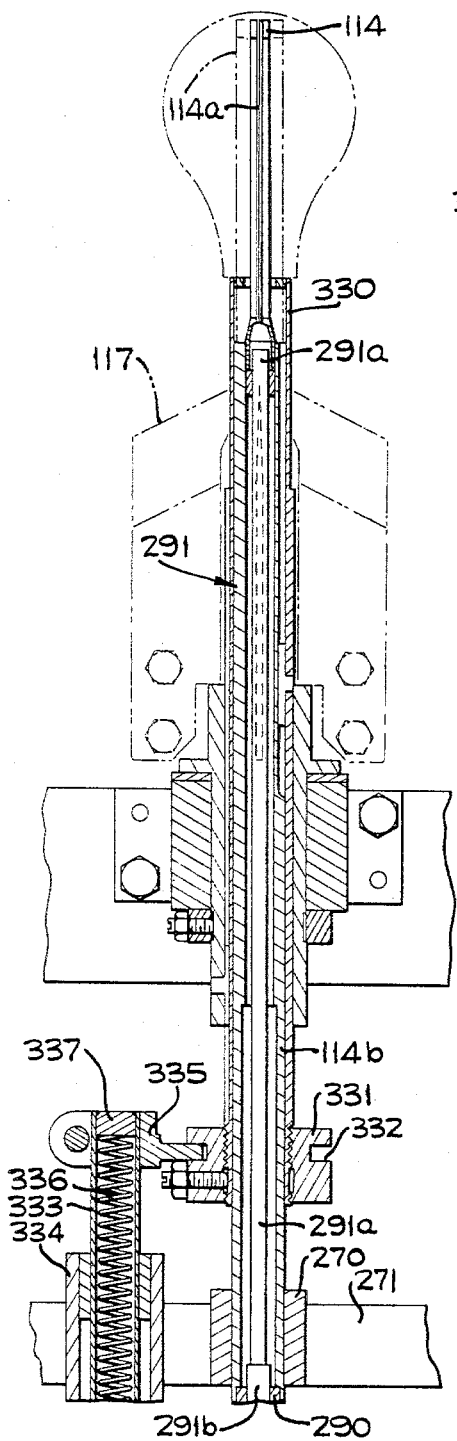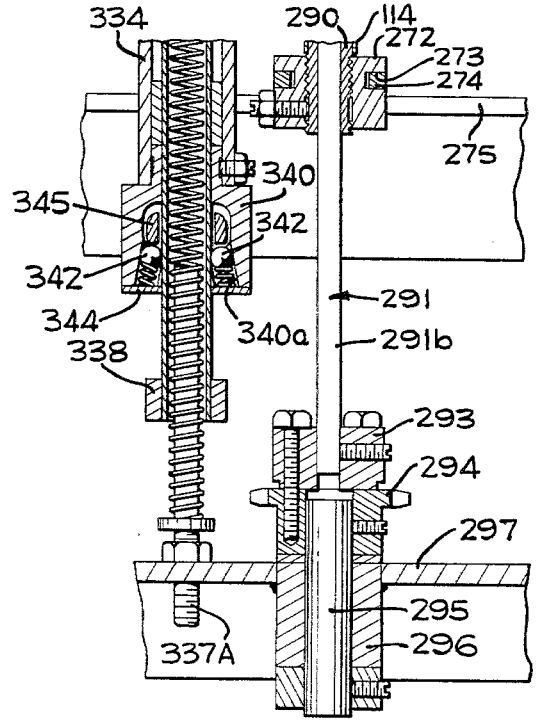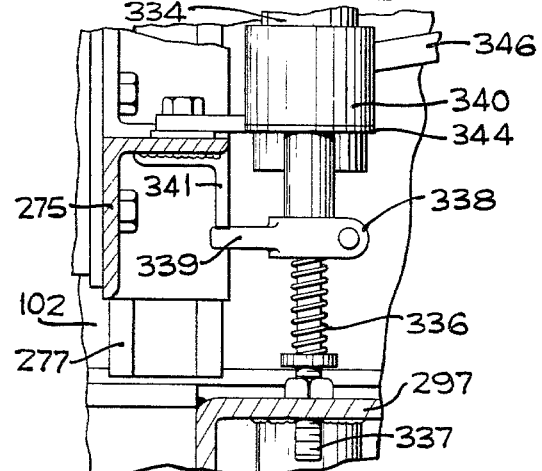

May 24, 1966  S. H. CREED  3,252,591
FRUIT FEEDING MECHANISM
Original Filed May 31, 1962  15 Sheets-Sheet 15
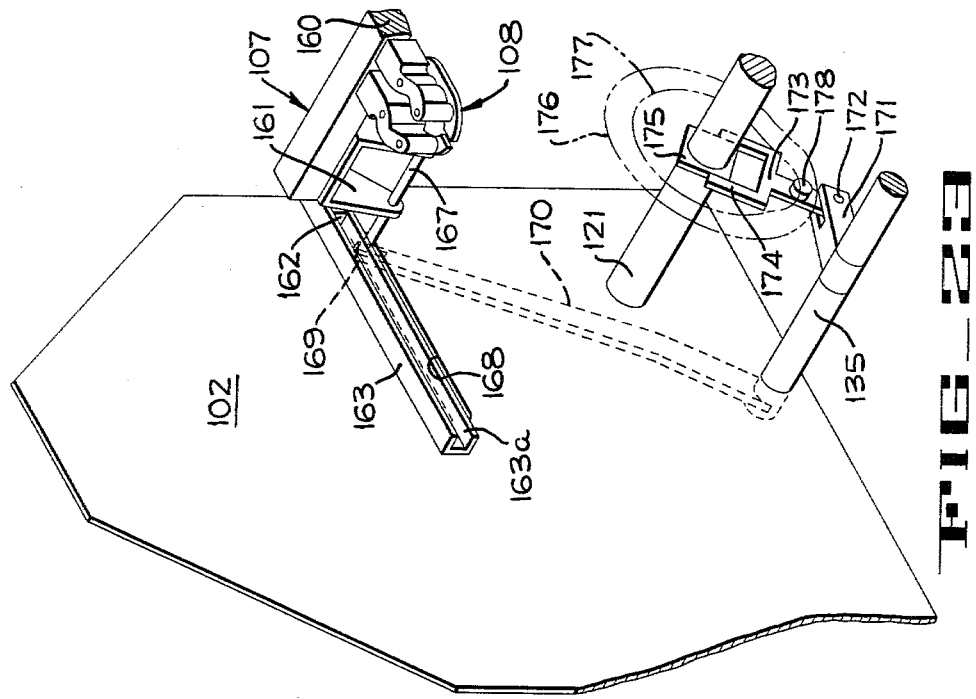
FIG_23
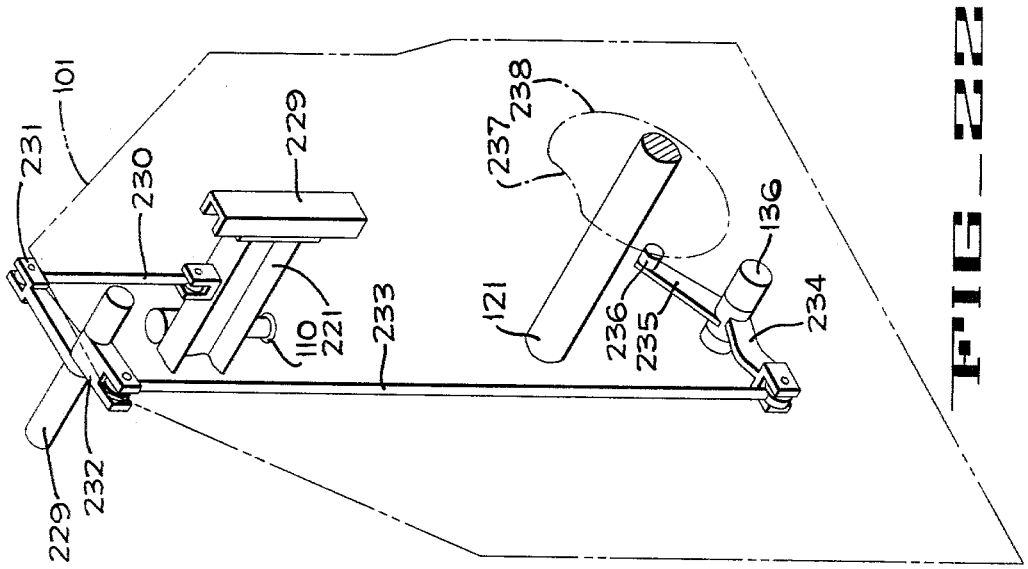
FIG_22
INVENTOR
SHERMAN H. CREED
BY Hans F. Hoffmeister
ATTORNEY

United States Patent Office 3,252,591
Patented May 24, 1966

3,252,591
FRUIT FEEDING MECHANISM
Sherman H. Creed, San Jose, Calif., assignor to FMC Corporation, San Jose, Calif., a corporation of Delaware
Original application May 31, 1962, Ser. No. 198,990, now Patent No. 3,211,201, dated Oct. 12, 1965. Divided and this application Dec. 16, 1964, Ser. No. 418,697
2 Claims. (Cl. 214—1)

The present application is a division of the application of Sherman H. Creed, Serial No. 198,990 filed on May 31, 1962, now Patent Number 3,211,201, dated October 12, 1965.

This invention relates to fruit feeding mechanisms, and more particularly to a mechanism for transferring fruit, such as pears, from carriers to impaling tubes.

An object of the invention is to provide an improved fruit feeding mechanism.

Another object of the invention is to provide a machine wherein the fruit is fed into a feed cup with its blossom end uppermost and is fed downwardly therefrom by gravity into a transfer cup which aligns the stem-blossom axis vertically and carries the fruit to a stem end trimming station, and subsequently to an impaling station whereat an impaling tube axially impales the fruit and a peeling mechanism peels the fruit while it is impaled on the impaling tube.

Another object of the invention is to provide a mechanism for controlling the movements of a fruit carrier and an impaling tube whereby the fruit is transferred from the carrier to the tube.

Other objects and advantages of the instant invention will become apparent in the reading of the following detailed description in conjunction with the accompanying drawings, wherein:

FIG. 4 is a perspective view of the two cooperating shells of a feed cup.

Figure 2:
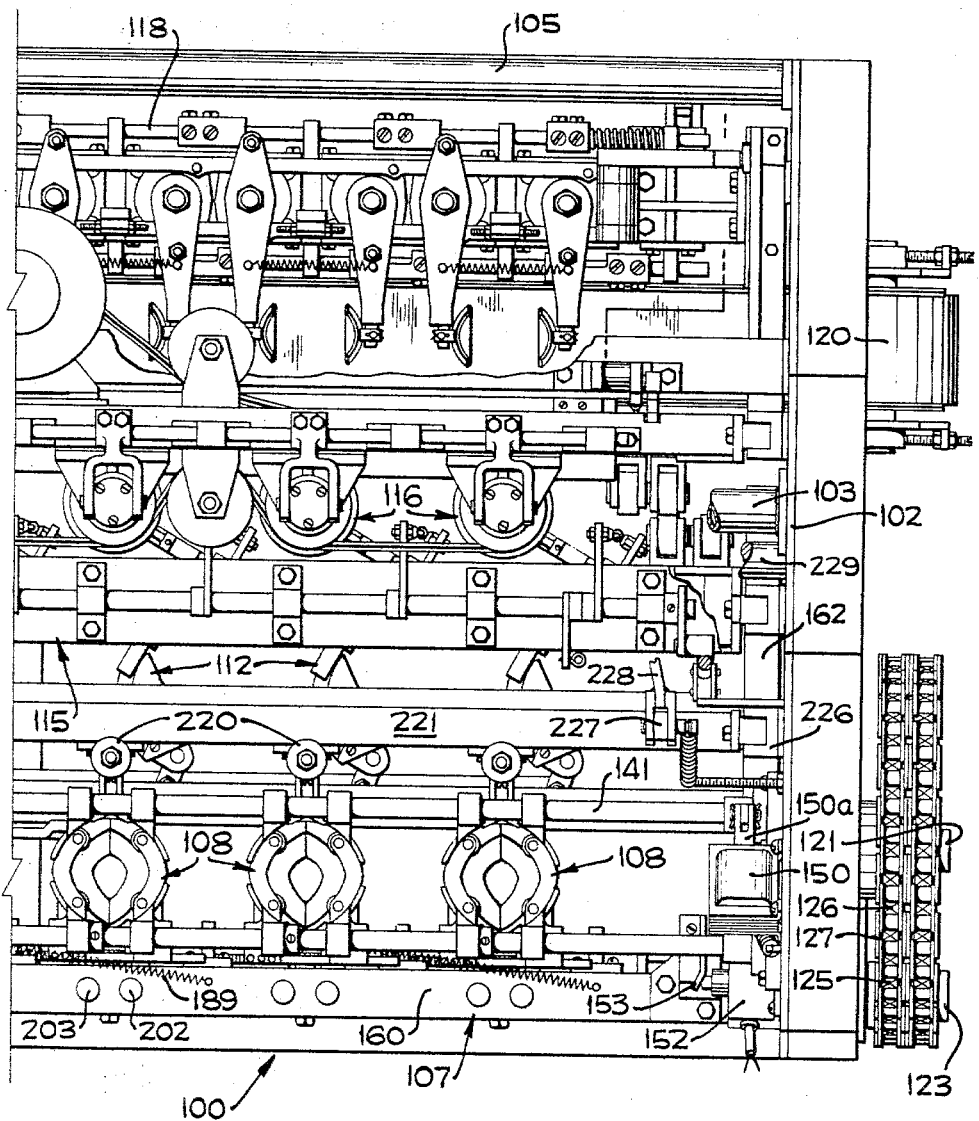
FIG. 2 is a plan of a part of the machine.

FIGS. 5, 6 and 7 together form the upper, middle and lower portions, respectively, of an enlarged sectional view taken generally on line 5—5 of FIG. 2.

FIGS. 8, 9 and 10 show three positions of the Geneva drive mechanism in the drive assembly for rotating the impaling tubes.

FIGS. 11 and 12 together form a reduced horizontal sectional view taken on line 11—11 of FIG. 6 and illustrate the drive assembly for rotating the impaling tubes.

FIG. 13 is a schematic view showing all of the machine drives.

FIG. 14 is a perspective view of one of the transfer cups looking from front to rear thereof.

FIG. 15 is a perspective view of one of the transfer cup assemblies looking from the rear toward the front, one side of the cup being broken away to show the fruit aligning members therebeneath.

FIG. 16 is a fragmentary sectional view showing a portion of the transfer cup carriage and illustrating the cams for opening and closing the transfer cups.

FIG. 17 is a fragmentary perspective view illustrating one of the pear seating members, one pair of the vertical gauge bars, and one of the stem end trimming knives.

FIG. 18 illustrates the actuating mechanism for the stem end trimming knives.

FIG. 19 is a sectional view of one of the impaling tubes, nose stop and splitting blade assemblies.

FIG. 20 is a continuation of FIG. 19 and shows the lower portion of said assembly.

FIG. 21 is a side elevation of the lower portion of the assembly shown in FIG. 20 taken generally on line 21—21 of FIG. 20.

FIG. 22 is a schematic perspective view of the actuating mechanism for the pear pressers.

FIG. 23 is a schematic perspective view of the actuating mechanism for the transfer cup carriage.

FIG. 24 is a schematic perspective view of the actuating mechanism for the transfer cups.

Referring now to the drawings wherein similar reference numerals are used to denote the same elements throughout the various views shown, the device comprises a rectangular base 100 (FIG. 1) having two upstanding side plates 101 and 102 fixed thereto. The upper portions of the side plates 101 and 102 are tied together by a bracing rod 103, the mid-portion of the front edges of the plates by a bracing rod 104 (FIG. 1), and the mid-portion of the rear edges of the plates by a similar bracing rod (not shown).

For purposes of convenience in description, the side of the machine wherein the pears are introduced will hereinafter be referred to as the front of the machine, the opposite side accordingly will be referred to as the rear of the machine and the right and left sides, respectively, will be designated from the point of view of a person standing in front of the machine and looking toward the rear.

Figure 1:
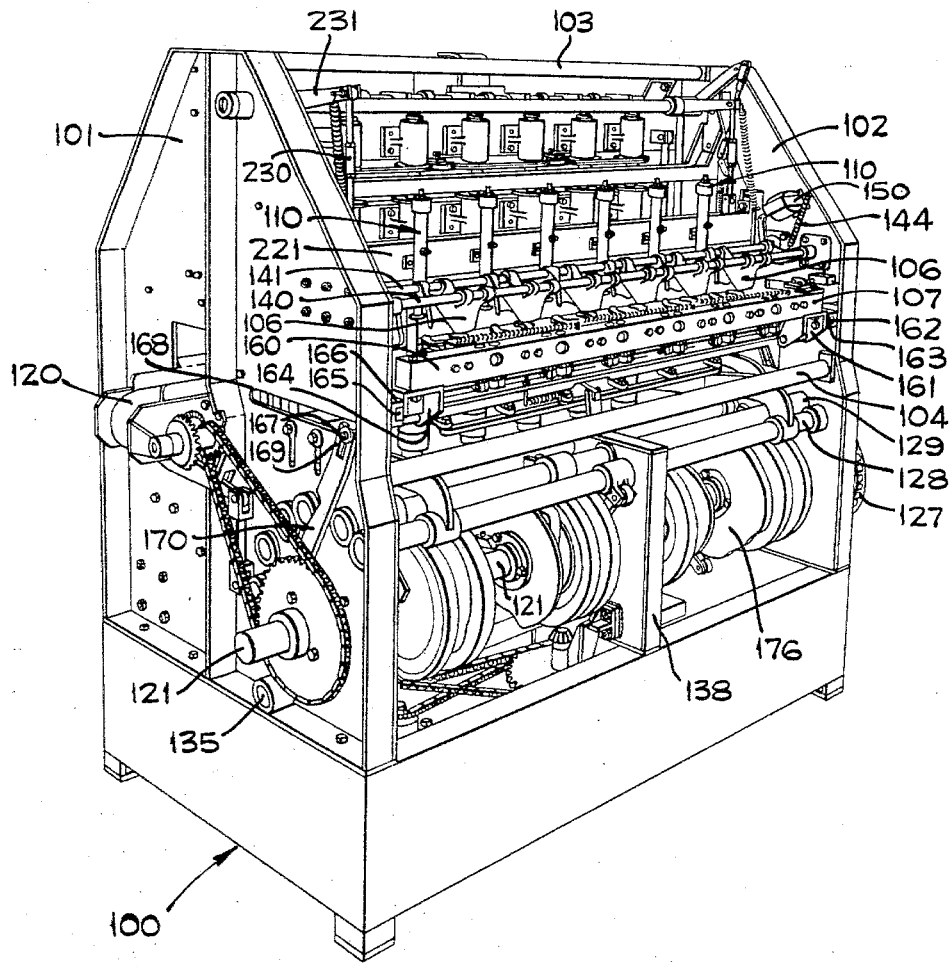
FIG. 1 is a perspective view looking at the front or feeding side of the machine from the left side thereof.
Figure 3:
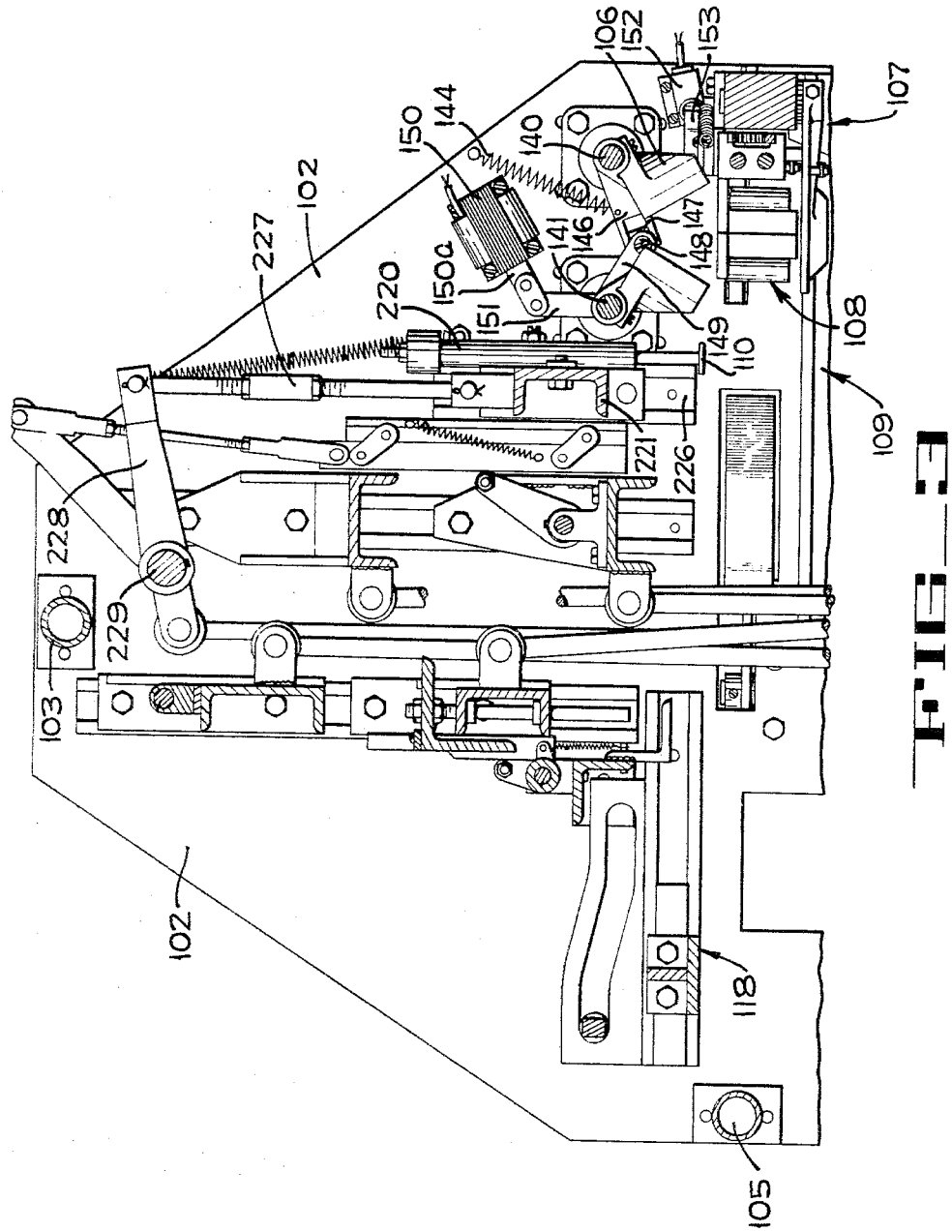
FIG. 3 is an enlarged sectional view taken generally on line 3—3 of FIG. 2.

Referring now to FIGS. 1, 3 and 5, the machine generally comprises a plurality of feed cups 106 which are mounted in a line adjacent the front of the machine and are arranged to receive pears stem-end-down from the operator of the machine. In the particular machine shown, there are six of these cups at points equally spaced transversely of the machine. A transfer cup carriage 107 carries a plurality of transfer cups 108 each of which is disposed immediately below a feed cup to receive a pear from the cup. The carriage is arranged to move rearwardly in the machine to carry pears in the transfer cups 108 to a stem end trimming station, generally indicated at 109 in FIG. 6, at which each pear is moved downwardly by a presser member 110 (FIG. 3) against a gauge stop 111 (FIG. 6). While the stem end of the pear is held against the gauge 111, the stem end is trimmed by the knife of a stem end trimming unit 112. From the stem end trimming station 109, each pear is further carried rearwardly in the machine by the transfer cup 108 to a station, generally indicated at 113 (FIG. 5), at which the pear is impaled on an impaling tube 114, peeled by a peeling knife assembly 115, cored by a coring unit 116 and cut into halves by a splitting blade assembly 117 (FIG. 6).

After the pears are impaled by the impaling tubes 114, the pears are released from the transfer cups 108 and the carriage 107 is returned to the front of the machine to receive a new group of pears. Prior to the coring operation, a clamp carriage 118 (FIG. 5), located adjacent the rear of the machine, is moved forward and the clamps thereon grip the pears and hold them during the coring and splitting operations. The impaling tubes 114 are withdrawn as the coring knives enter the pears. After the coring and splitting operations are finished, the clamp carriage 118 moves rearwardly with the split pears. When the clamp carriage reaches its rearmost position, the clamps are opened to permit the pear halves to drop onto a discharge conveyor 120 (FIG. 6).

The various operating units are actuated in timed relation with each other by a plurality of cams mounted on a cam shaft 121 (FIGS. 1 and 6), which extends transversely of the machine adjacent the front thereof and is rotatably supported between the side plates 101 and 102. The cam shaft 121 is rotated by a motor 122 (FIG. 7) mounted within the base 100 of the machine and connected to a jack shaft 123 by a chain drive 124. The outer end of the jack shaft 123 (FIG. 2) projects outwardly of the machine through the right side of the base 100 and is provided with a sprocket 125. The sprocket 125 is connected by a drive chain 127 to a sprocket 126 fixed to the right end of the cam shaft 121. As best seen in FIG. 6, a plurality of cam follower mounting shafts 128, 129, 130, 131, 132, 134 and 135 extend parallel to the cam shaft 121 and are rotatably mounted in the side plates 101 and 102 at points circumferentially spaced about the cam shaft 121. The shaft 133 extends from the side plate 101 only to a center plate 138, and a second shaft 133A coaxial therewith extends from the plate 138 to the side plate 102. Each of the shafts 133A and 128 to 135, inclusive, carries a cam follower arm for cooperation with one of the cams on the cam shaft in a manner more fully described hereinbelow. A short cam follower shaft 136 is rotatably mounted in the left side plate 101 only and carries a cam follower which cooperates with the came on the cam shaft nearest the side plate 101. A second short shaft is rotatably mounted in the right side plate 102 coaxial with the shaft 136 and carries a cam follower which cooperates with the cam nearest the side plate 102.

Feed cup assembly

Each feed cup 106 (FIG. 4) comprises two generally semi-cylindrical shells 106A and 106B which are setscrewed to rods 140 (FIG. 5) and 141 respectively. The rods extend parallel to each other in a horizontal plane transversely of the machine and each rod is journalled for rotation at its opposite ends in the side plates 101 and 102. In FIG. 5, the feed cup shells 106A and 106B are shown in their open position which is adapted for dropping a pear into a transfer cup 108 therebeneath. As best seen in FIG. 3, the rod 140 is urged clockwise, as viewed therein, by a tension spring 144 fixed at one of its ends to the right side plate 102 and at its other end to a link 146 fixed to the rod 140. The link 146 is bifurcated at its outer end and embraces a block 147 that is rotatable on a pin 148 fixed to a link 149 which is fixedly mounted on the rod 141. With this arrangement, when the shaft 140 is rotated clockwise by the spring 144, the rod 141 will be rotated counterclockwise to move the feed cups to their closed position. A feed cup actuating solenoid 150 is mounted on the side plate 102 and has a plunger 150a pivotally connected to the outer end of a link 151 fixed to the rod 141. The solenoid 150 is energized through a micro switch 152 mounted on the side plate 102 adjacent the path of movement of the transfer cup carriage 107 and is arranged to be actuated by a cam 153 mounted on the carriage when the transfer cups 108 are in vertical alignment with the feed cups. When energized, the solenoid 150 rotates the rod 141 clockwise and the rod 140 counterclockwise to open the cups 106. The spring 144 moves the cups to their closed position when the solenoid 150 is deenergized.

Transfer cup assembly

Referring now to FIG. 1, the transfer cup carriage 107 comprises an elongated bar-like carrier 160 which has an inverted U-shaped bracket 161 fixed to the bottom of the member 160 adjacent the right end thereof. A block 162 is fixed to the outer leg of the bracket 161 and is slidably received within a horizontal track 163a (FIG. 23) provided by a channel 163 fixed to the inner surface of the side plate 102. A similar inverted U-shaped bracket 164 (FIG. 1) is fixed to the bottom surface of the member 160 adjacent the left end thereof and a similar block 165 on the bracket 164 is slidably received within a horizontal track provided by a channel 166 fixed to the inner surface of the side plate 101. The horizontal tracks extend from the front to the rear of the side plates 101, 102 and thus the carriage 107 is mounted for reciprocatory movement forwardly and rearwardly of the machine.

As best seen in FIG. 23, a short rod 167, which is fixed to the bracket 161, projects through a suitable slot 168 formed in the side plate 102 and is received within the bifurcated end 169 of an actuating arm 170 that is fixed to the actuating cam follower shaft 135. Similar mechanism connects the opposite end of the carriage 107 to the opposite end of the shaft 135 as seen in FIG. 1. A cam follower arm 171 (FIG. 23) is mounted at one of its ends on the shaft 135. The other end of the arm 171 is pivotably attached by a pin 172 to a cam follower link 173 which has a bifurcated end 174 in sliding engagement with a square block 175 rotatably mounted on the cam shaft 121 adjacent a transfer cup carriage actuating cam 176 keyed to the cam shaft 121. A cam groove, indicated by the dot-dash center line 177, is formed in the side surface of the cam 176 and receives a cam follower roller 178 rotatably mounted on the link 173 intermediate its ends.

Transfer cups

The transfer cups 108 are carried by two rods 180 and 181 (FIGS. 14 and 15) which are slidably mounted adjacent the rear face of the elongated carrier 160 by a plurality of brackets 182 fixed to said carrier and extending rearwardly therefrom. The rods 180 and 181 lie in the same vertical plane and slidably carry a plurality of pairs of arms 183 and 184, each pair of arms forming one of the transfer cups 108. Each arm 183 has a recess 183a (FIG. 14) in its forward end. A horizontally extending, upwardly facing rack member 185 is secured in the recess 183a and is disposed adjacent the rear face of the carrier 160 (FIG. 15). Similarly, each arm 184 has a recess 184a in which a horizontally extending, downwardly facing rack member 186 is secured in opposed relation to the rack 185. A spur gear 187 is in mesh with each of the racks 185 and 186 and is rotatably mounted on a stud 188 (FIG. 14) which projects through and is fixed to the carrier 160 whereby when one of the arms 183 or 184 is moved in one direction, its opposing arm will automatically be moved in the opposite direction. A spring 189 is fixed at one of its ends to a pin 190 on the arm 184 and at its other end to the carrier 160 in order to urge the arm 184 toward its associated arm 183. A collar 191 is adjustably fixed to the rod 180 by means of a set screw 192 and abuts the inner side of the arm 184 to limit its movement toward the associated arm 183. The rods 180 and 181 are adapted to be moved toward the left side of the machine, to the left as viewed in FIG. 14, and to the right as viewed in FIG. 15, in order to move the arms 183 and 184 away from each other in a manner described hereinbelow.

The arms 183 and 184 of each transfer cup 108 carry fruit-centering members. The arm 184 has a V-shaped notch 195 on each side of which a pair of rollers 193 and 194 are mounted for rotation about a vertical axis. Similarly, a pair of rollers 196 and 197 are rotatably mounted adjacent the inner surface of the arm 183 with a V-shaped notch 198 formed in said surface therebetween, whereby the arms 183 and 184 are moved toward each other, the rollers 193, 194, 196 and 197 will contact the butt end of a pear therebetween to aid in vertically aligning the pear.

The lower end of each transfer cup 108 is formed by a pair of pear supporting and aligning arms 200 and 201 which have split ends 200a and 201a respectively which are adjustably secured to a pair of pivot pins 202 and 203, respectively, that project downwardly from the carrier 160. The arms 200 and 201 extend rearwardly from the carrier 160 to a position beneath the arms 183 and 184 to form the lower end of the transfer cup 108. The arm 200, adjacent its inner end, is provided with a downwardly and inwardly tapered conical surface 206, and the arm 201 is provided with a similar downwardly and inwardly tapered conical surface 207 in opposed relation thereto. The surfaces 206 and 207 are adapted to receive the stem end of the pear as it is dropped into the transfer cup 108, and the generally conical opening formed by the arms provides a pivot surface which cooperates with the rollers 193, 194, 196 and 197 in vertically aligning the pear.

The pear support arms 200 and 201 are moved from each other by means of the rod 181 which has a collar 208 (FIG. 15) fixed thereon by means of a set screw 209. The collar 208 is provided with a downwardly extending lug 210 abutting the inner edge of the arm 201. A pair of meshing spur gears 211 and 212 (FIG. 14) are respectively mounted on the pivot pins 202 and 203 of the carrier 160 and are respectively fixed to the arms 200 and 201, whereby when the arm 201 is urged to the right as viewed in FIG. 15 by the lug 210, the meshing spur gears cooperate to move the arm 200 in the opposite direction to move the inclined surfaces 206 and 207 away from each other a distance sufficient to permit the transfer cup 108 to be retracted from a pear. A return spring 213 is attached at one of its ends to a pin 214 extending downwardly from the arm 201 and at its other end to the carrier 160 and is arranged to move the arms 200 and 201 to closed position.

As best seen in FIG. 16, the rod 180 is provided adjacent its right end with a cam follower roller 215 mounted for rotation about a vertical axis and adapted to contact the cam surface of a cam 216 fixed to the side plate 102 to open the transfer cups 108 when the carriage 107 is in its forwardmost position in the manner illustrated in FIG. 16. After a pear is received in the transfer cup, the cup is moved rearwardly causing the follower roller 215 to move out of contact with cam 216 to permit the transfer cup arms to engage the butt end of the pear and pivot it to upright position. A second cam 217 is adapted to contact both the follower 215 and a similar roller 218 (FIG. 24) on the rod 181 to actuate both of the rods 180 and 181 to open both the transfer cup arms 183 and 184 and the arms 200 and 201 thereunder when the carriage is in its rearmost position in a manner hereinafter described.

*Pear seating and stem end trimming mechanism*

After being deposited in a transfer cup 108 and moved to a generally vertical position, the pear is carried by the transfer cup to a stem end trimming station 109 (FIG. 17). At this station, the presser member 110 is moved downwardly against the butt end of the pear to center the pear on the inclined surfaces of the yieldable arms 200 and 201 and to move the stem end of the pear downwardly against two gauge stops 111, which are described more fully hereinafter. The nose of the pear forces the conical surfaces 206 and 207 on the arms 200 and 201 outwardly against the action of the spring 213, thus aligning the nose of the pear while the rollers 193, 194, 196 and 197 on the inwardly urged arms 183 and 184, respectively, align the butt end of the pear so that the pear axis is vertical.

The presser member 110 is slidably mounted within a tube 220 fixed to a vertically movable channel member 221. The presser member 110 is normally urged downwardly relative to the tube 220 by a compression spring 222 within the tube 220. The downward motion of the presser member 110 relative to the tube 220 is limited by a set screw 223 threaded into the tube 220 and extending into a suitable slot 224 formed in the portion of the presser member 110 within the tube 220. In the lowest position of presser member 110, the set screw 223 abuts the wall at the upper end of the slot 224.

The channel member 221 is mounted for vertical reciprocation in a guide 225 (FIG. 5) mounted on the inner surface of the side plate 101 and in a guide 226 (FIG. 1) mounted on the inner surface of side plate 102. As shown in FIG. 3, a link 227 connects one end of the angle member 221 with one end of a lever arm 228, the other end of which is secured to a shaft 229 rotatably mounted by the side plates 101 and 102 adjacent the upper end of the machine. A second link 230 (FIG. 5) connects the other end of the channel member 221 to one end of a second lever arm 231, the other end of which is fixed to the shaft 229.

Referring to FIG. 22, an arm 232 is fixed to one end of the shaft 229 and extends forwardly therefrom. The outer end of the arm 232 is connected by a link 233 to the outer end of an arm 234 secured to the cam follower mounting shaft 136 previously described. A similar linkage connects the other end of the shaft 229 with the shaft 136. A cam follower arm 235 is fixed to the cam follower mounting shaft 136 and rotatably supports, on its outer end, a cam follower roller 236 which contacts the outer cam surface 237 of a plate cam 238 fixed to the cam shaft 121.

It may be seen from the foregoing description that when the channel member 221 is lowered by means of the actuating mechanism just described, the presser member 110 will contact the blossom end of the pear within the transfer cup 108, and that the channel member 221 and the tubes 220 attached thereto are permitted to overtravel by means of the telescopic connection between the presser members 110 and the tubes 220 to thereby accommodate pears of different sizes.

When the pear is pressed downwardly by the presser member 110, the stem end thereof contacts the pair of gauge stop members 111 which are in the form of bent rods fixed by setscrews 241 to a block 242 which, in turn, is bolted to a rigid angle member 240 that extends transversely of the machine and is fixed to the side plates 101 and 102.

*Stem end trimming knives*

A stem end trimming unit 112 (FIG. 17) is associated with each set of gauge members 111. Each unit 112 comprises a knife blade 244 extending in the horizontal plane and having a cutting edge 245. The blade 244 is secured to a support arm or bracket 246 which is fixed to the upper end of a vertically extending pivot shaft 247 rotatably mounted in a tube 248 fixed to the forward face of an angle member 243 which extends transversely of the machine rearwardly of and parallel to the angle member 240, and is fixed to the side plates 101 and 102. The lower end of the shaft 247 is provided with an arm 249 adjustably clamped thereto by a bolt 250. The outer end of the arm 249 is pivotally secured to an actuating rod 251 by a bolt 252. The actuating rod 251 is provided with a forwardly extending block 253 pivotally mounted on a shaft 254 fixed to the rod 251. The block 253 is received within the bifurated end 255 of an operating lever 256 pivotally mounted intermediate its ends on a pivot pin 257 (FIG. 18) mounted in a bifurcated bracket 258 secured to the vertically extending plate 138 (FIG. 6) which, in turn, is fixed to the base 100. The lower end of the actuating lever 256 (FIG. 18) is provided with a roller 260 mounted for rotation on a pin projecting from the lever 256. The roller 260 is adapted to be contacted by an actuating cam 261 mounted on one face of a mutilated drive pinion 262 fixed to the cam shaft 121. The mutilated drive pinion 262 is one portion of a Geneva drive assembly 263.

From the description of the foregoing mechanism, it may be seen that when the cam 261 contacts the roller 260, the actuating lever 256 will be rocked clockwise (FIG. 18) about the pivot pin 257 to move the actuating rod 251 (FIG. 17) toward the right, as viewed in FIG. 17. Movement of rod 251 causes rotation of each of the knife blades 244 counterclockwise to cut off the stem end of the pears which are being held against the gauge members 111 by the presser members 110.

After the stem end trimming and pear aligning operations, the presser members 110 are raised, the knift blades 244 are retracted to the postion illustrated in FIG. 17, and the transfer cup carriage 107 is further advanced toward the rear of the machine to move the pears into alignment with the impaling tubes 114.

*Impaling tubes*

As shown in FIGS. 19 and 20, each of the impaling tubes 114 is mounted for rotation within, and for longitudinal movement with respect to, a tubular mounting bracket 270 fixed to a transversely extending channel member 271 which in turn is fixed to the side plates 101 and 102. A collar 272 (FIG. 20) is fixed to the lower end of the impaling tube 114 and is provided on its outer surface with an annular groove 273. The impaling tube is raised and lowered relative to the tubular bracket 270 by means of yoke member 274, the bifurcated end of which is received within the groove 273 and the other end of which is fixed to an actuating carriage member 275 extending transversely of the machine and mounted for vertical reciprocatory movement in suitable guides 276 and 277 (FIGS. 11 and 12) fixed to the inner surfaces of the side plates 101 and 102, respectively.

As best seen in FIG. 24, the carriage member 275 is raised and lowered within its guides 276 and 277 by means of a pair of arms 278 and 279 pivotally attached one adjacent each end thereof. The arms 278 and 279 are fixed to the cam follower mounting shaft 134 previously mentioned. A cam follower mounting arm 280 is fixed at one of its ends to the shaft 134 and is pivotally secured at its other end to one end of a link 281. The opposite end of the link 281 is bifurcated, in the manner indicated at 282, and slidably embraces a block 283 rotatably mounted on the cam shaft 121 adjacent an impaling tube actuating cam 284 fixed thereto. A cam follower roller 285 is rotatably mounted on the link 281 intermediate its end and is slidably received within a cam groove formed in the side surface of the cam 284 and indicated by the dot-dash line 286.

Referring now to FIGS. 16 and 24, a cam 287 is fixed to the carriage member 275 adjacent the right end thereof. The cam 287 is adapted to contact a roller 288 mounted on one end of a lever arm 288a extending through suitable opening in the side plate 102. The lever arm 288a is fixed at its other end to a vertical shaft 289 rotatably mounted in suitable bearings mounted on the outside of the side plate 102. An arm 289a is fixed to the upper end of the vertical shaft 289 and carries, on its outer end, the cam 217 (previously described), whereby as the carriage member 275 is raised by the mechanism just described to raise the impaling tubes and impale the pears, the action of the cam 287 contacting the roller 288 adjacent the upper limit of the movement of the impaling tubes will actuate the cam 217 to push the rods 180 and 181 on the transfer cup carriage 107 to the left of the machine (to the right as viewed in FIG. 24) to open both the transfer cups 108 and the aligning arms 200 and 201 to permit the transfer cup carriage 107 to return toward the front of the machine and leave the pears mounted on the impaling tubes.

*Rotary drive for impaling tubes*

Each of the impaling tubes 114 has an upper bladed portion 114a and a lower tubular portion 114b which is provided adjacent its lower end with a block 290 (FIG. 20) having a bore of square cross section. A rotatable spindle 291 extends upwardly within the impaling tube portion 114b. The upper portion 291a of the spindle 291 (FIG. 19) is round and terminates adjacent the upper end of the impaling tube portion 114b when the impaling tube is in its lowermost, or retracted, position and serves as an ejection member to eject through the open upper end of the tube any pulp material which may be within the tube when it is lowered relative to the spindle 291. The lower portion 291b (FIG. 20) of the spindle 291 is of square cross sectional configuration to cooperate with the bore of the block 290 and provide a rotary driving connection between the spindle 291 and the impaling tube 114 regardless of the relative longitudinal positions of the two members. The lower end of the spindle 291 (FIG. 20) is received in a collar 293 which is bolted to a sprocket 294 that in turn is fixed to a stub shaft 295. The stub shaft 295 is rotatably mounted in a suitable bearing sleeve 296 fixed to an inverted channel member 297 (FIG. 6) secured to the upper portion of the machine base 100 and extending transversely of the machine.

Referring now to FIGURE 13, the spindles 291 are intermittently rotated by the Geneva drive mechanism 263 mounted on the cam shaft 121 through a drive mechanism illustrated in FIGURES 11, 12 and 13. The drive mechanism comprises a chain 300 (FIGS. 11 and 13) which is in driving engagement with the sprockets 294 on each of the sprindles associated with the three impaling tubes adjacent the left side of the machine, and also in driving relation with a driving sprocket 302 fixed to a shaft 302a which is journalled for rotation in suitable bearings, not shown, fixed to the inverted channel member 297. Similarly, a drive chain 303 (FIG. 12) is in driving relation with the several sprockets 294 associated with the three impaling tubes 114 adjacent the right side of the machine and also in driving relation with a drive sprocket 304 fixed to a shaft 305 journalled for rotation in suitable bearings, not shown, fixed to the inverted channel member 297.

The two shafts 302a and 305 are interconnected for rotation at the same speed by a chain 306 disposed under the member 297. The chain 306 is indicated by the dot-dash center line 306 in FIGURES 11 and 12. The shaft 302a is connected by a chain drive 307 to a large driving sprocket 308 fixed to a vertical shaft 309 journalled for rotation in suitable bearings supported by a bracket 310 (FIG. 11) fixed to the plate 318 previously described. The upper end of the shaft 309 (FIGS. 11 and 13) has fixed thereto a bevel gear 311 which is in mesh with a second bevel gear 312 fixed to a horizontally extending shaft 313 journalled for rotation in a suitable bearings 314 supported by the plate 318. A spur gear 315 (FIGS. 12 and 13) is fixed to the shaft 313 and is adapted to mesh with the teeth on the mutilated pinion 262 (FIG. 13) of the Geneva drive mechanism 263.

A locking member 316 (FIGS. 8, 9 and 10) is fixed to the spur gear 315 for rotation therewith. The locking member 316 is provided with a concave arcuate surface 317 adapted to cooperate with a convex arcuate surface 318 formed on a cam 319 fixed to the mutilated drive gear 262 to lock the shaft 313 and prevent rotation thereof when the spur gear 315 is not in mesh with the teeth on the mutilated drive gear 262. The lock member 316 is provided with two slots 320 and 321 adjacent the arcuate concave surface 317. Two arms 322 and 323 are mounted on the mutilated drive gear 262 for rotation therewith. A roller 324 is rotatably mounted on the arm 323 and is adapted to be slidably received within the slot 320 to rotate the locking member 316 into the proper position for the mating surfaces 317 and 318 to engage each other and prevent rotation of the shaft 313 when the teeth on the mutilated gear 262 disengage the teeth on the spur gear 315. Similarly, a roller 325 is rotatably mounted on the arm 322 and is adapted to be slidably received in the slot 321 to rotate the lock member 316 into proper position for the meshing engagement of the teeth on the mutilated drive gear 262 with the teeth of the spur gear 315 when the mating surfaces 317 and 318 disengage.

From the foregoing description, it will be seen that during one portion of the cycle of the cam shaft 121, the impaling tubes 114 remain stationary and that during another portion of the cycle of the came shaft 121 the impaling tubes are rapidly rotated for purposes which will later be described. As best seen in FIG. 19, the impaling tubes 114 are provided adjacent their upper ends with laterally extending diametrically opposed fins 114a, whereby when the impaling tubes 114 are rotated, the pear impaled thereon will be rotated therewith.

*Nose stop mechanism*

Referring again to FIGS. 19 and 20, a tubular nose stop member 330 surrounds the upper portion of the impaling tube in telescopic relation therewith. A collar 331 is fixed to the lower end of the nose stop member 330 and is provided on its outer surface with an annular groove 332. A tubular nose stop actuating member 333 is slidably mounted in a sleeve 334 that is fixed to the frame channel member 271 adjacent the mounting sleeve 270 of the impaling tube 114. A yoke 335 is fixed to the upper end of the nose stop actuating member 333, and the forked end of the yoke 335 is received within the annular groove 332 formed in the collar 331. A compression spring 336 is disposed within the nose stop actuating member 333 and presses against a plug 337 in the upper end thereof. The opposite end of the spring 336 receives a guide stud 337A which is fixed to the frame member 297 whereby the nose stop actuating member 333 is normally urged upwardly by the spring to raise the nose stop member 330 relative to the impaling tube 114. A clamp 338 (FIGS. 20 and 21) is fixed to the lower end of the nose stop actuating member 333 below the sleeve 334. The clamp 338 is provided with a lug 339 which projects rearwardly into the path of movement of a small angle member 341 (FIG. 21) welded to the impaling tube actuating member 275 whereby when the member 275 is lowered to lower the impaling tubes, the angle member 341 will contact the lug 339 at the time the upper end of the impaling tube is even with the upper end of the nose stop 330. Further lowering movement of the member 275 will move both the impaling tube 114 and the nose stop 330 downwardly in unison.

As is best seen in FIG. 20, a locking mechanism is provided to prevent upward movement of the nose stop 330 when the lock is in its locked relation to the nose stop. The lock comprises a tubular housing 340 fixed to the lower end of the sleeve 334 and provided with an upwardly and inwardly tapering inner surface 340a. A plurality of balls 342 are mounted between the nose stop actuating member 333 and the inner surface 340a of the housing 340 and are normally urged upwardly by a plurality of springs therebeneath, said springs being retained by an annular plate 344 fixed to the lower end of the housing 340, whereby the balls 342 will wedge themselves between the inclined surface 340a of the housing 340 and the outer surface of the nose stop actuating member 333 to prevent upward movement thereof.

The bifurcated end 345 (FIG. 20) of a lock releasing arm 346 extends through a suitable opening in the housing 340 and contacts the upper surface of the balls 342 whereby downward movement of the end 345 of the arm 346 will move the balls 342 downwardly to permit movement of the nose stop actuating member 333 relative to the housing 340. The arm 346 is clamped to an actuating shaft which is rotatably mounted on the side plates 101 and 102.

Referring to FIG. 5 it will be noted that a tubular butt stop 520 is mounted directly above each impaling tube at the impaling station 113. The stop 520 is slidable in a tube 521 that is fixed to a carrier channel 522 that is mounted for vertical movement in the machine. A collar 524 that is secured to the upper end of the butt stop 520 is pressed against the upper end of the tube 521 by a weight member in the form of an angle bar 540. When the carrier channel 522 is raised, the butt stop is raised through engagement with the collar 524. Also, lowering movement of the carrier 522 permits the butt stop to lower into engagement with a pear at the impaling station.

The actuating mechanism for the carrier channel 522 as well as all other mechanisms of the machine are disclosed in the above mentioned parent application Serial No. 198,990 and it will be understood that reference may be had to said application for a disclosure of any part of the machine not specifically described herein.

*Operation*

Referring particularly to FIGS. 4 and 5, a pear is dropped stem-end-down into the cups 106A and 106B when they are closed and at a time when the transfer cup carriage 107 is farthest away from the feed cups. The transfer cup 108 is then moved forward to a position wherein it is in vertical alignment with the feed cup 106. When the transfer cup 108 reaches this position, the feed cup 106 is opened by the solenoid 150 and the pear is dropped into the transfer cup 108. The transfer cup then moves rearwardly until the pear is in vertical alignment with the presser member 110 and the gauge bars 111. During this rearward movement the cam 216 (FIG. 16) releases the rods 180 and 181 and the arms 184 and 183, and the arms 200 and 201 are spring urged toward closed position. The presser member 110 is moved downwardly and the stem end of the pear is seated against the gauge bars 111. During the time the pear is being seated, the rollers of the transfer cup 108 and the pear aligning arms 200 and 201 cooperate to vertically align the pear. While the pear is held against the gauge bars 111, the knife assembly 112 is actuated to cut off the stem end of the pear and the cut-off portion drops away from the pear.

After a suitable interval to permit certain operations to be completed on the preceding pear in the manner more fully described hereinbelow, the transfer cup 108 is moved further rearwardly to a position in vertical alignment below the butt stop 520 and above the impaling tube 114. The butt stop 520 is then moved downwardly against the butt or blossom end of the pear and the impaling tube 114 is moved upwardly into the pear. It should be noted at this point that the blossom end of all of the six pears are indexed at the same height regardless of the pear size, through the use of the weight 540 and the mechanism associated therewith in the manner previously described. The nose stop 330 is released and moves upwardly until it strikes the nose of the pear. The nose stop is then locked in this position. The several nose stops may move different amounts depending on the individual pear sizes, but each of the nose stops 330 will be in contact with its associated pear. It will be noted that it is at this point in the cycle that the succeeding pear is deposited in the now closed feed cup 106.

The transfer cup 108 and the aligning arms 200 and 201 are now opened, and the transfer carriage 107 moves forwardly away from the pear now impaled on the impaling tube 114.

From the foregoing description it will be evident that the present invention provides a particularly efficient mechanism for automatically feeding fruit to an impaling tube, the only manual operation that is required being the dropping of the fruit into the cups 106.

Having thus described my invention, what I claim as new and desire to protect by Letters Patent is:

1. In a fruit preparation machine, a transfer carriage mounted for horizontal reciprocating movement, said carriage including a support member, a first rod slidable in said support member, a pair of cooperating fruit support arms having inclined surfaces defining a generally conical socket, means connecting said arms to said first rod whereby sliding movement of said rod in one direction moves said arms to spaced-apart fruit-discharging position, a second rod slidable in said support member, a pair of cooperating fruit-centering arms disposed above said fruit-support arms, means connecting said pair of fruit-centering arms to said second rod whereby movement of said second rod in said one direction moves said fruit-centering arms to fruit-discharge position; means for moving said fruit-support arms toward each other to form said generally conical socket for receiving the stem end of a pear; means for moving said fruit-centering arms toward each other to engage the blossom end of the pear and pivot the pear about its stem end; means for aligning the pear with an impaling tube; means causing relative movement between said tube and said pear to effect impaling of the pear on the tube, and cam means for engaging both of said slidable rods to move them in said one direction to move both sets of arms to fruit-discharging position.

2. In a fruit preparation machine, a transfer carriage mounted for horizontal reciprocating movement, said carriage including a support member, a first rod slidable in said support member, a pair of cooperating fruit support arms having inclined surfaces defining a generally conical pivot socket, means connecting said arms to said first rod including meshing gears interconnecting said arms whereby sliding movement of said first rod in one direction moves said arms to spaced-apart fruit-discharge position, a second rod slidable in said support member, a pair of cooperating fruit-centering arms disposed above said fruit-support arms, means connecting said pair of fruit-centering arms to said second rod including a rack and pinion mechanism whereby movement of said second rod in said one direction moves said fruit-centering arms away from each other to a fruit-discharge position; spring means for moving said fruit-support arms toward each other to form said pivot socket for receiving one end of an elongate fruit deposited therein; means for moving said fruit-centering arms toward each other to engage the opposite end portion of the elongate fruit and pivot it about the pivot surface provided by said socket to align the pear vertically, means for aligning the pear vertically with an impaling tube and transferring the pear to said impaling tube, and cam means for engaging both of said slidable rods to move them in said one direction to move both sets of arms to fruit-discharge position.

References Cited by the Examiner

UNITED STATES PATENTS

| | | | |
|---|---|---|---|
| 2,431,310 | 11/1947 | Coons | 146—51 |
| 2,649,878 | 8/1953 | Coons | 146—52 X |
| 2,664,129 | 12/1953 | Coons | 146—51 X |
| 2,984,274 | 5/1961 | Creed et al. | 146—52 X |

MARVIN A. CHAMPION, *Primary Examiner.*